United States Patent [19]

Sweet

[11] Patent Number: 4,528,571

[45] Date of Patent: Jul. 9, 1985

[54] FLUID JET PRINT HEAD HAVING BAFFLE MEANS THEREFOR

[75] Inventor: George W. Sweet, Richardson, Tex.

[73] Assignee: The Mead Corporation, Dayton, Ohio

[21] Appl. No.: 586,456

[22] Filed: Mar. 5, 1984

[51] Int. Cl.[3] .......... G01D 15/18

[52] U.S. Cl. .......... 346/75; 346/140 R

[58] Field of Search .......... 346/75, 140

[56] References Cited

U.S. PATENT DOCUMENTS

| | | | |
|---|---|---|---|
| 3,739,393 | 6/1973 | Lyon et al. | 346/75 X |
| 4,060,812 | 11/1977 | Mako et al. | 346/75 |
| 4,135,197 | 1/1979 | Stoneburner | 346/75 |
| 4,146,899 | 3/1979 | Paranjpe | 346/75 |
| 4,167,742 | 9/1979 | Head et al. | 346/75 |
| 4,245,225 | 1/1981 | Fillmore et al. | 346/75 |
| 4,245,227 | 1/1981 | Krause | 346/75 |

*Primary Examiner*—Joseph W. Hartary

*Attorney, Agent, or Firm*—Biebel, French & Nauman

[57] ABSTRACT

A fluid jet print head for producing a plurality of jet drop streams of fluid includes a manifold defining an elongated slot and an orifice plate defining a plurality of orifices, arranged in at least one row, which communicate with the cavity. A transducer arrangement, including a piezoelectric means, is mounted in the cavity and is spaced from the orifice plate so as to define a fluid reservoir therebetween. The transducer arrangement further includes acoustic isolation material which surrounds the piezoelectric means and supports the piezoelectric means in the cavity. The transducer means, when electrically excited, produces pressure waves of substantially uniform wave front which travel through the fluid in the reservoir toward the orifice plate and cause break up into jet drop streams of fluid flowing through the orifice. A cylindrical baffle is positioned in the fluid reservoir so as to contact the walls of the slot and the piezoelectric means to prevent establishment of transverse standing waves within the slot.

10 Claims, 4 Drawing Figures

FLUID JET PRINT HEAD HAVING BAFFLE MEANS THEREFOR

BACKGROUND OF THE INVENTION

The present application relates to fluid jet print heads and, more particularly, to a print head having a stimulation arrangement of the type which produces pressure varicosities in the individual fluid jets, resulting in substantially uniform breakup of the jets into streams of drops.

Ink jet printers, incorporating fluid jet print heads, are known which have an orifice structure defining a plurality of orifices. The orifices receive an electrically conductive recording fluid, such as a water-base ink, from a pressurized fluid supply manifold and eject the fluid in one or more rows of parallel streams. As the streams break up into drops, the drops are selectively charged and deflected, with some of the drops being deposited on a print-receiving medium and the balance of the drops being caught by an appropriate catcher structure.

Charging of the drops is accomplished by selectively applying charging voltages to charge electrodes positioned near each of the streams. The fluid flowing through each orifice emerges as a fluid filament. Drops break away from the tip of the fluid filament and carry charges related to the voltage of the associated charge electrode at the instant of drop formation. Each drop is then subjected to an electrostatic field which deflects the drop by a distance proportional to the magnitude of the charge which it carries. Drops may thus be deflected to one or more print positions or, when a drop is not to be deposited on the print-receiving medium, deflected to an adjacent catcher structure.

With print heads of the type used in ink jet printers, it is necessary to control drop formation since if left to natural stiumulating disturbances, the fluid filaments would break up erratically into drops of various sizes at irregular intervals. Such erratic drop formation would prevent proper charging and deflection of the drops. Accordingly, it is customary to apply a stimulating disturbance to all of the fluid streams to produce jets of uniformly sized and regularly spaced drops.

Various types of stimulation arrangements have been suggested. U.S. Pat. No. 3,739,393, issued June 12, 1973, to Lyon et al, discloses an ink jet print head in which the fluid orifices are defined by a thin, relatively flexible orifice plate. A piezoelectric transducer contacts the orifice plate at one end and produces a series of bending waves which travel longitudinally along the plate. Dampers at each end of the orifice plate dampen these traveling waves and prevent wave reflection. The bending waves in the orifice plate produce an oscillatory movement of the orifices which, in turn, causes pressure varicostities in the fluid filaments energing from the orifices. As a consequence, the fluid filaments break up into relatively uniform jet drop streams.

It will be appreciated that break up of the drop streams is nonsynchronous in a print head employing traveling wave stimulation. The print head, therefore, cannot be operated at its maximum printing resolution since the precise time of drop formation for each stream will be unknown and charge voltages must be supplied to the charge electrodes for sufficient time periods to insure that they result in appropriate charging of at least one drop. As a consequence more than one drop is usually charged in succession and partially charged drops, formed during charge voltage transition periods, are commonly formed.

One solution to this problem is to apply drop stimulating disturbances to all filaments in synchronism. If all of the jets have the same diameter and velocity, and stimulating disturbances are applied to the jets simultaneously, all filaments will generate drops in synchronism. Such synchronized drop generation greatly simplifies the application of charge signals to the charge electrodes, because the timing for each of the jet transitions can be timed to occur between drop formations. The number of partially charged drops is therefore substantially reduced.

One print head that employs this approach to drop stimulation is disclosed in copending, commonly assigned U.S. patent application Ser. No. 496,159 filed May 19, 1983 now abandoned and refiled as C-I-P Ser. No. 630,926, filed July 16, 1984. The print head includes a manifold defining an elongated cavity and an orifice plate defining a plurality of orifices arranged in a single row. A transducer arrangement is mounted in the cavity, spaced from the orifices plates so as to define a fluid reservoir therebetween. The transducer, when electrically excited, produces pressure waves of substantially uniform wave front which travel through the fluid in the reservoir toward the orifice plate and cause breakup into jet drop steams of fluid flowing through the orifices. Since the pressure waves are in the form of a wave front, the amplitude and phase of the fluid stimulation at each orifice is substantially uniform across the orifice plate.

The transducer is formed from an elongated block of piezoelectric material which has a plurality of slots defined therein extending alternately from opposite sides of the transducer partially therethrough. Each slot is substantially perpendicular to the row of orifices, and prevent wave propagation along the transducer. Additionally, the transducer is mounted within acoustic isolation material to prevent unwanted vibrations from being transmitted through the cavity walls.

Notwithstanding the foregoing preventative measures, it has been found that it is not practically possible to produce a wave front that is exactly uniform in amplitude and phase along its length. While such a stimulation arrangement yields better performance than the traveling wave approach of, for example, Lyon et al, any variation in the frequency or amplitude with which one or more portions of the transducer operates can cause traveling waves to be produced which move laterally along the fluid reservoir. This in turn causes non-synchronous drop generation.

What is needed, therefore, is a print head arrangement utilizing wave front stimulation that will further improve such an approach to drop formation with respect to the traveling wave method by preventing the formation of standing waves within the fluid reservoir.

SUMMARY OF THE INVENTION

A fluid jet print head for producing a plurality of jet drop steams of fluid includes a manifold means defining an elongated slot therein, the walls of the slot converging toward a first side of the manifold means. Piezoelectric means are mounted on the manifold means so as to close the slot on the second slot of the manifold means, opposite the first side, with the piezoelectric means including a piezoelectric transducer assembly extending along the length of the slot. An orifice plate is mounted on the manifold means on the first side thereof so as to close the slot and define a fluid-receiving reservoir with the manifold means and the piezoelectric means. The orifice plate defines a plurality of orifices communicating with the reservoir, the orifices being arranged in at least one row extending parallel to and communicating with the slot. A baffle means is positioned in the fluid-receiving reservoir and contacts the walls of the slot and the piezoelectric means. The baffle means is formed of a compressible material which is compressed between the walls and the piezoelectric means.

The baffle means may comprise a generally cylindrical baffle positioned in the reservoir and held in compression between the transducer assembly and the walls of the slot. The baffle, in turn, may comprise a threaded rod. The threaded rod may be formed of a compressible nylon material.

The transducer assembly may include one or more piezoelectric transducers positioned along substantially the entire length of the slot in contact with the baffle means. The baffle means may be formed so as to have an acoustic impedance that is substantially the same as that of the fluid supplied to the reservoir.

Accordingly, it is an object of the present invention to provide a fluid jet print head that utilizes a plane wave front for fluid stimulation and that achieves improved performance over known print heads utilizing the same approach; to provide such a print head in which the improved performance is achieved through use of a baffle to dampen transverse standing waves within the ink reservoir; to provide such a print head wherein the baffle is of simple and inexpensive construction; and to provide such a print head wherein the baffle may be incorporated into the print head without substantial modification thereof.

Other objects and advantages of the present invention will be apparent from the following description, the accompanying drawings, and the appended claims.

DETAILED DESCRIPTION OF THE PREFERRED EMBODIMENT

Figure 1:
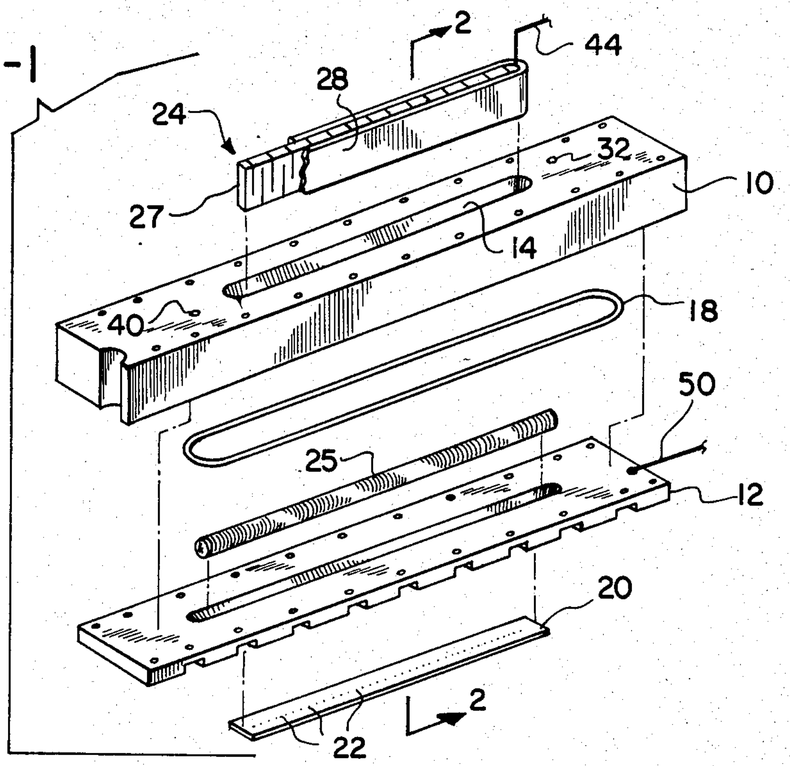
FIG. 1 is an exploded perspective view, illustrating a preferred embodiment of the present invention.
Figure 2:
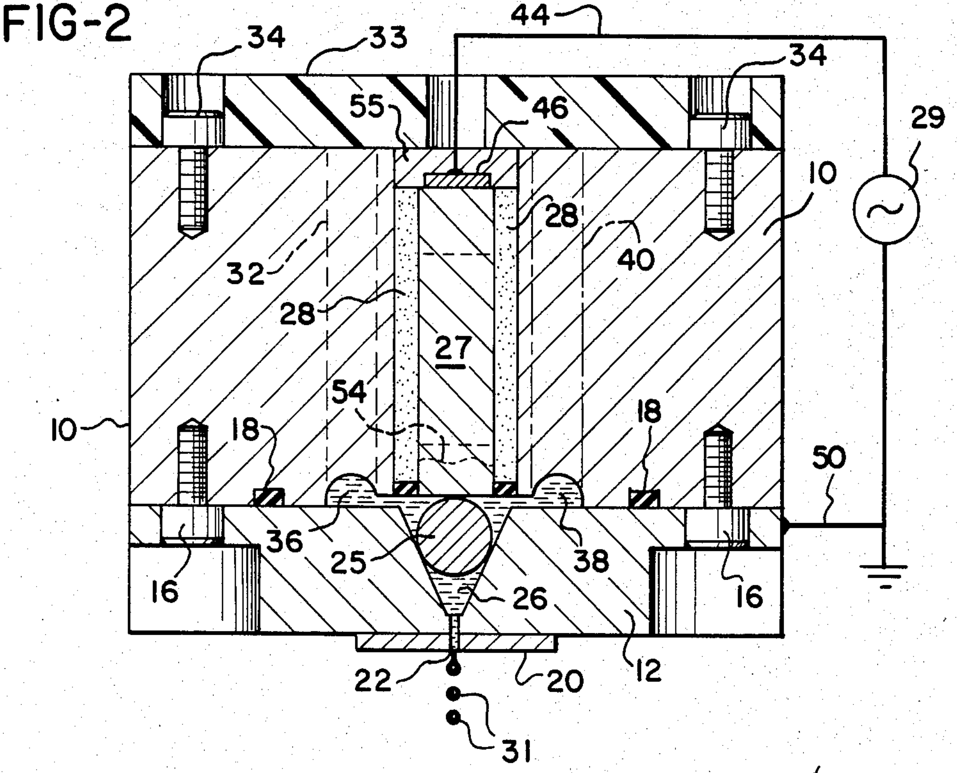
FIG. 2 is a sectional view taken generally along line 2—2 in FIG. 1.

The present invention relates generally to a fluid jet print head, such as may be utilized in an ink jet printing system for producing a plurality of jet drop streams. As seen in FIGS. 1 and 2, the fluid jet print head has a manifold means, including upper manifold portion 10 and lower manifold portion 12, which defines an elongated cavity 14 therein. Manifold portions 10 and 12 are held together by bolts 16, compressing a sealing ring 18 therebetween which provides a fluid-tight seal.

The print head further includes an orifice plate 20 which defines a plurality of orifices 22 which are arranged in at least one relatively long row. Orifice plate 20 is mounted on the bottom of manifold portion 12 by an adhesive or, alternatively, by soldering or other appropriate means. The orifices 22 communicate with cavity 14 and the row of orifices extends generaly parallel to the direction of elongation of the cavity 14.

Figure 3:
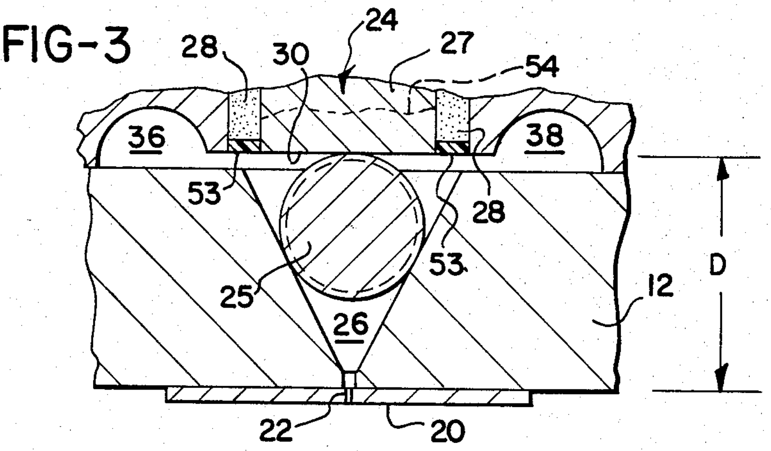
FIG. 3 is an enlarged partial sectional view, similar to FIG. 2.

A stimulator means 24 is mounted in cavity 14 and, as shown in FIG. 3, is spaced from orifice plate 20 by a distance D of approximately ½ wavelength of the stimulation waves through the fluid used by the print head. The stimulator 24 and the orifice plate 20 define a fluid reservoir 26 therebetween. Stimulator means 24 includes a plurality of piezoelectric means which are defined by elongated transducer 27 and which lengthen and contract vertically when electrically excited with an osciallating signal. The stimulator means further includes acoustic isolation material 28 which surrounds the piezoelectric means and provides a means of supporting the piezoelectric means in the cavity 14.

A baffle means in the form of a cylindrical threaded rod 25 is placed within cavity 14 as indicated in FIG. 1. The rod 25 is threaded along its entire length, and is selected of a diameter such that rod 25 is in contact with and slightly compressed by the walls of fluid reservoir 26 and by the lower surface 30 of the elongated transducer 27. Rod 25 is therefore constructed of an at least slightly compressible material, and is preferably formed from a nylon material.

The oscillatory movement of the bottom surfaces 30 of the piezoelectric means produces pressure waves of substantially uniform phase front in the fluid in the reservoir 26 as well as in rod 25. These waves travel downward through the fluid and are coupled to the fluid filaments flowing through the orifices 22 causing them to break up into jet drop streams. The transucer 27, constructed of a ceramic piezoelectric material, changes dimension when subjected to an appropriate voltage differential. The transducer 27 vibrates vertically in response to an osciallating excitation signal produced by an electrical signal generator 29 at a frequency corresponding to the output frequency of the generator.

As seen in FIG. 2, the fluid filaments break up into a series of relatively uniform, evenly spaced drops 31. As a result of the substantially uniform phase front of the waves in the fluid, the filament stimulation is substantially synchronized and drops in each of the jet drop streams are thus produced substantially in synchronization. As a practical matter, however, it is not possible to completely synchronize the filament stimulation along the length of transducer 27. Transverse standing waves can be generated along the length of the fluid reservoir 26.

It has been found that use of threaded rod 25 as a baffle means applies a loading force to surface 30 of transducer 27 along its length, with the result that non-uniformities in fluid stimulation are compensated for. As a result, more uniform formation of drops 31 is produced. By using a threaded rod 25, fluid passageways are formed through which ink may move from the upper portions of reservoir 26 past the baffle means and to the orifices 22 at the lower portion of reservoir 26.

In order to avoid having the baffle means introduce its own non-uniformities into the stimulation of the fluid within reservoir 26, it is necessary to select a rod 25 constructed of a material whose acoustic impedance is substantially the same as that of the fluid within reservoir 26. It has been found that the impedance match between the preferred nylon material and the ink typically used within a fluid jet print head is sufficient to avoid the introduction of such non-uniformities. In fact, the impedance match between the preferred nylon material and the ink has been found to be better than the impedance match between the piezoelectric material of transducer 27 and the ink.

Once produced, ink drops 31 may be electrically charged in a known matter by means of charge electrodes, adjacent the tips of the fluid filaments, to which charge voltages are applied during the formation of the drops. Since the drops 31 are formed in synchronization, the charge voltages may be applied to the electrodes in synchronization, producing controlled, precise charging of individual drops in the streams. After charging, drops 31 are deflected by an electrical field or fields to a catcher or, alternately, to a print-receiving medium, as is known in the art.

Fluid is supplied to the reservoir 26 via fluid supply inlet 32 which, as shown in FIG. 2, extends downward through upper manifold portion 10 and a support plate 33, attached to manifold portion 10 by bolts 34. Inlet 32 terminates in a channel 36 which extends substantially the entire length of the reservoir 26. A similar channel 38 communicates with the reservoir 26 and a fluid outlet 40 and provides a means of removing fluid from the print head or during cross flushing at shutdown.

Figure 4:
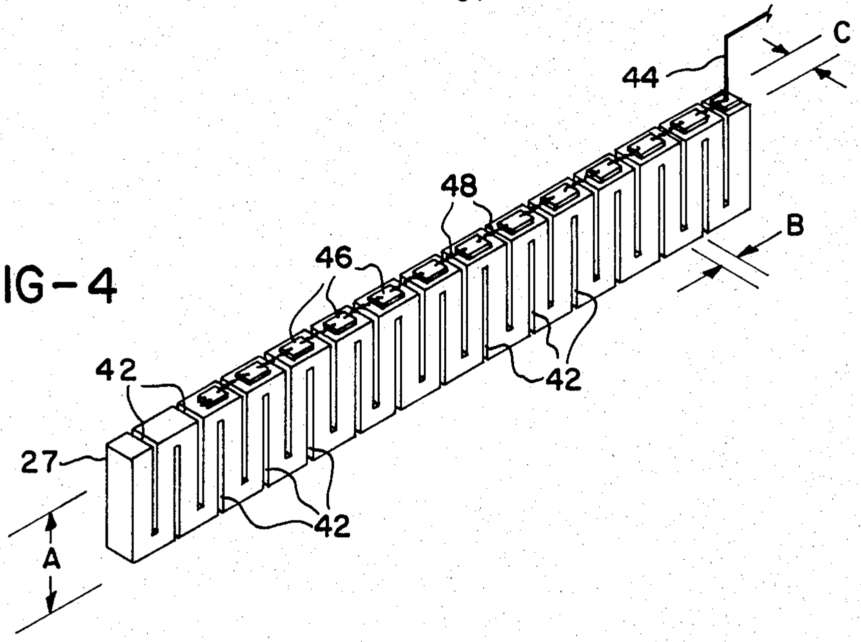
FIG. 4 is a perspective view of the piezoelectric means incorporated in the invention.

As seen in FIG. 4, the elongated transducer 27 defines a plurality of slots 42 which extend alternately from opposite sides and partially therethrough so as to define the plurality of piezoelectric means. Each of the slots is substantially perpendicular to the row of orifices when the transducer is positioned in cavity 14, as shown in FIG. 1. Slots 42 may be formed by cutting a block of piezoelectric material, leaving approximately 0.05 inch (0.13 cm) between the end of the slot and the opposite face of the block. In one transducer contructed according to the present invention, slots cut from the same side were spaced apart by a distance of approximately 0.25 inch (0.63 cm).

Slots 42 reduce substantially the possibility of wave movement or bending along the length of the transducer 27. Additionally, the acoustic isolation material, which may for example be a polyurethane foam material, provides a means of supporting the piezoelectric transducer so that vibrations are not coupled to the manifold portion 10. Thus, unwanted wave transmission through the transducer or associated support structure is minimized, and generally undistored downward traveling waves are produced in the fluid in reservoir 26.

In order to provide for electrical stimulation of the plurality of piezoelectric means, the electrical signal generator 29 is coupled by means of conductor 44 to a plurality of electrodes 46. Each electrode 46 is associated with an provides a means of energizing a respective one of the piezoelectric means, i. e., that section of the transducer defining the particular piezoelectric means. As shown in FIG. 4, the electrodes 46 may be connected in parallel by conductors 48 which bridge the slots 42. These electrodes may be plated onto the piezoelectric material prior to cutting slots 42.

Conductor 50 provides a means of electrically connecting the generator 28 to conductive fluid in reservoir 26 via electrically conductive manifold portion 12. The fluid contacts the surfaces 30 on the bottom of the transducer and effectively acts as a second set of electrodes, opposing electrodes 46. The fluctuating potential difference between electrodes 46 and the fluid contacting the opposite side of the transducer provides the desired fluctuating voltage potential across the transducer, causing the piezoelectric means to vibrate vertically.

As shown in FIGS. 1 and 2, the acoustical isolation material 28, which is of low density, surrounds the transducer 27, effectively isolating it from manifold portion 10. Further, the material 28 retains the transducer 27 in position within the cavity 14, since it is bonded to both the transducer 27 and the manifold portion 10. A sealing means, such as a room-temperature vulcanized silicone 53, extends across and into slots 42, as indicated at 54, so as to seal the slots 42 and prevent flow of fluid from the reservoir 26 into the slots. The room temperature vulcanized silicone material 53 also covers the acoustic isolation material 28. This prevents the fluid in the reservoir from contacting the acoustic isolation material in the instance where a porous foam is utilized. It should be noted, however, that material 53 does not cover surfaces 30, thereby permitting electrical contact between these surfaces and the fluid. Also provided in cavity 14 is a layer of expoxy 55 which acts as a backing material for the stimulator means while, at the same time, sealing the stimulator transducer 27 and the slots 42 defined therein from atmosphere.

It is preferred that the height A (see FIG. 4) of transducer 27 be no greater than one-half of the wavelength of the waves in the elongated transducer 27 so that it will act as a good piston radiator. Any greater height may tend to produce bowing of the transducer. The space B between alternate slots 42 and the width C of the transducer 27 are preferably limited to one-sixth to one-eight of the wavelength of the vibrations in the transducer 27. Such dimensional limitations ensure that substantial wave movement along the length of the transducer is not produced.

While the form of apparatus herein described constitutes a preferred embodiment of this invention, it is to be understood that the invention is not limited to this precise form of apparatus, and that changes may be made therein without departing from the scope of the invention, which is defined in the appended claims.

What is claimed is:

1. A fluid jet print head for producing a plurality of jet drop streams consisting of drops of uniform size and spacing, comprising:

manifold means defining an elongated slot therein having a pair of opposing side walls, said walls converging toward a first side of said manifold means, piezoelectric means mounted on said manifold means so as to close said slot on the second side of said manifold means, opposite said first side, said piezoelectric means including a peizoelectric transducer assembly extending along the length of said slot, orifice plate means, mounted on said manifold means on said first side thereof so as to close said slot and define a fluid-receiving reservoir with said manifold means and said piezoelecric means, said orifice plate means defining a plurality of orifices communicating with said reservoir, said orifices being arranged in at least one row extending parallel to and communicating with said slot, and baffle means positioned in said fluid-receiving reservoir and contacting said walls of said slot and said piezoelectric means, said baffle means being formed of a compressible material which is compressed between said walls and said piezoelectric means.

2. The print head of claim 1 wherein said baffle means further comprises a generally cylindrical baffle positioned in said reservoir and held in compression between said piezoelecric transducer means and said walls of said slot.

3. The print head of claim 2 wherein said baffle means further comprises a threaded rod.

4. The print head of claim 3 wherein said threaded rod is formed of a compressible nylon material.

5. The print head of claim 1 wherein said transducer assembly includes one or more piezoelectric transducers positioned along substantially the entire length of said slot in contact with said baffle means.

6. The print head of claim 1 wherein the acoustic impedance of said baffle means is substantially the same as that of the fluid supplied to said reservoir.

7. A fluid jet print head for producing a plurality of jet drop streams arranged in at least one row, comprising:

manifold means defining a fluid-receiving reservoir, an orifice plate mounted on said manifold means and defining a plurality of orifices arranged in at least one row, said orifices communicating with said fluid-receiving reservoir, transducer means mounted on said manifold and communicating therewith to produce plane waves which travel through the fluid in said reservoir to said orifices, and baffle means positioned in said reservoir for applying a loading force to the surface of said transducer means along its length, whereby uniform stimulation is produced along said row of orifices.

8. The print head of claim 7 wherein said reservoir includes a pair of opposing side walls, and said baffle means includes a generally cylindrical rod positioned in said reservoir and held in compression between said transducer means and said side walls.

9. The print head of claim 8 wherein said cylindrical rod is a threaded rod.

10. The print head of claim 9 wherein said threaded rod is formed of a compressible nylon material.

* * * * *